(12) United States Patent
Koeppel et al.

(10) Patent No.: US 12,125,036 B2
(45) Date of Patent: *Oct. 22, 2024

(54) TRANSACTION CARD SECURITY DEVICE

(71) Applicant: Capital One Services, LLC, McLean, VA (US)

(72) Inventors: Adam Koeppel, Washington, DC (US); Saleem Sangi, Ellicott City, MD (US); Robert Perry, Ashburn, VA (US); Kevin Kelly, Austin, TX (US)

(73) Assignee: Capital One Services, LLC, McLean, VA (US)

( * ) Notice: Subject to any disclaimer, the term of this patent is extended or adjusted under 35 U.S.C. 154(b) by 227 days.

This patent is subject to a terminal disclaimer.

(21) Appl. No.: 17/444,290

(22) Filed: Aug. 3, 2021

(65) Prior Publication Data
US 2021/0365954 A1    Nov. 25, 2021

Related U.S. Application Data

(63) Continuation of application No. 16/458,515, filed on Jul. 1, 2019, now Pat. No. 11,087,326, which is a
(Continued)

(51) Int. Cl.
*G06Q 40/00* (2023.01)
*G06K 19/07* (2006.01)
(Continued)

(52) U.S. Cl.
CPC ... *G06Q 20/40145* (2013.01); *G06K 19/0701* (2013.01); *G06Q 20/34* (2013.01);
(Continued)

(58) Field of Classification Search
CPC ............ G06Q 20/40145; G06Q 20/34; G06Q 20/341; G06Q 20/354; G06Q 20/355;
(Continued)

(56) References Cited

U.S. PATENT DOCUMENTS 7,172,563 B2    2/2007    Takiguchi et al.
D651,237 S    12/2011    Mullen et al.
(Continued)

FOREIGN PATENT DOCUMENTS

WO    WO-2016109600 A1 *    7/2016    ......... G06K 9/00892

OTHER PUBLICATIONS

Wang et al: "FreeWalker: a smart insole for longitudinal gait analysis", 37th Annual International Conference of the IEEE Engineering in Medicine and Biology Society (EMBC), DOI: 10.1109/EMBC.2015.7319202, Date of Conference: Aug. 25-29, 2015 (Year: 2015).*
(Continued)

*Primary Examiner* — Edward J Baird
(74) *Attorney, Agent, or Firm* — Harrity & Harrity, LLP

(57) ABSTRACT

An example transaction card may include a sensor to measure movement of the transaction card and one or more processors to monitor the movement of the transaction card via the sensor during a tracking period; determine measurements of a gait of a user during the tracking period from the movement of the transaction card during the tracking period; compare the measurements of the gait of the user during the tracking period and a gait signature associated with the transaction card; and/or perform an action associated with the transaction card based on a result of comparing the measurements of the gait of the user during the tracking period and the gait signature.

20 Claims, 6 Drawing Sheets

Related U.S. Application Data continuation of application No. 15/785,296, filed on Oct. 16, 2017, now Pat. No. 10,346,841.

(51) Int. Cl.
*G06Q 20/34* (2012.01)
*G06Q 20/40* (2012.01)
*G07F 7/08* (2006.01)
*G07F 7/12* (2006.01)

(52) U.S. Cl.
CPC ......... *G06Q 20/341* (2013.01); *G06Q 20/354* (2013.01); *G06Q 20/355* (2013.01); *G07F 7/0833* (2013.01); *G07F 7/125* (2013.01)

(58) Field of Classification Search
CPC ... G06K 19/0701; G07F 7/0833; G07F 7/125; A61B 5/112; A61B 5/6887
See application file for complete search history.

(56) References Cited

U.S. PATENT DOCUMENTS

| | | |
|---|---|---|
| D651,238 S | 12/2011 | Mullen et al. |
| D651,644 S | 1/2012 | Mullen et al. |
| D652,075 S | 1/2012 | Mullen et al. |
| D652,076 S | 1/2012 | Mullen et al. |
| D652,448 S | 1/2012 | Mullen et al. |
| D652,449 S | 1/2012 | Mullen et al. |
| D652,450 S | 1/2012 | Mullen et al. |
| D652,867 S | 1/2012 | Mullen et al. |
| D653,288 S | 1/2012 | Mullen et al. |
| D665,022 S | 8/2012 | Mullen et al. |
| D665,447 S | 8/2012 | Mullen et al. |
| D666,241 S | 8/2012 | Mullen et al. |
| D670,329 S | 11/2012 | Mullen et al. |
| D670,330 S | 11/2012 | Mullen et al. |
| D670,331 S | 11/2012 | Mullen et al. |
| D670,332 S | 11/2012 | Mullen et al. |
| D670,759 S | 11/2012 | Mullen et al. |
| D672,389 S | 12/2012 | Mullen et al. |
| D673,606 S | 1/2013 | Mullen et al. |
| D674,013 S | 1/2013 | Mullen et al. |
| D675,256 S | 1/2013 | Mullen et al. |
| D676,487 S | 2/2013 | Mullen et al. |
| D676,904 S | 2/2013 | Mullen et al. |
| 8,395,500 B1* | 3/2013 | Dent ................ G08B 13/1609 348/150 |
| D687,094 S | 7/2013 | Mullen et al. |
| D687,095 S | 7/2013 | Mullen et al. |
| D687,487 S | 8/2013 | Mullen et al. |
| D687,488 S | 8/2013 | Mullen et al. |
| D687,489 S | 8/2013 | Mullen et al. |
| D687,490 S | 8/2013 | Mullen et al. |
| D687,887 S | 8/2013 | Mullen et al. |
| D688,744 S | 8/2013 | Mullen et al. |
| D692,053 S | 10/2013 | Mullen et al. |
| 8,854,182 B2 | 10/2014 | Lobean et al. |
| 10,346,841 B2 | 7/2019 | Koeppel et al. |
| 10,621,316 B2* | 4/2020 | Huxham ................ G06F 21/35 |
| 10,929,829 B1* | 2/2021 | Hazelwood ............ H04N 7/183 |
| 11,087,326 B2 | 8/2021 | Koeppel et al. |
| 11,157,907 B1* | 10/2021 | Kumar ................ G06Q 20/34 |
| 11,538,126 B2* | 12/2022 | Vemury ............... G06Q 50/265 |
| 2008/0175443 A1 | 7/2008 | Kahn et al. |
| 2009/0030350 A1* | 1/2009 | Yang .................... A61B 5/7253 600/595 |
| 2011/0159850 A1* | 6/2011 | Faith .................. G06Q 30/0207 455/411 |
| 2014/0289528 A1 | 9/2014 | Baghdasaryan |
| 2014/0289833 A1 | 9/2014 | Briceno et al. |
| 2014/0341440 A1 | 11/2014 | Walch |
| 2016/0267760 A1* | 9/2016 | Trani ....................... G07C 9/28 |
| 2016/0307188 A1* | 10/2016 | Zarakas ............... G06Q 20/354 |
| 2016/0350761 A1 | 12/2016 | Raziel et al. |
| 2018/0074494 A1* | 3/2018 | Myers ................... G06Q 50/40 |

OTHER PUBLICATIONS

Damasevicius R., "Smartphone User Identity Verification Using Gait Characteristics," Symmetry, Sep. 2016, vol. 8 (10), 20 pages.

Extended European Search Report for Application No. EP18199613.3, mailed on Mar. 18, 2019, 8 pages.

Kanowitz S., "DISA Looks into CAC Options," Defense Systems, Jun. 26, 2018, 7 pages. [Retrieved on Mar. 6, 2019] Retrieved from Internet: [URL:https://defensesystems.com/articles/2018/06/26/cac-alternatives.aspx].

\* cited by examiner

TRANSACTION CARD SECURITY DEVICE

RELATED APPLICATION

This application is a continuation of U.S. patent application Ser. No. 16/458,515 (now U.S. Pat. No. 11,087,326), filed Jul. 1, 2019, which is a continuation of U.S. patent application Ser. No. 15/785,296, filed Oct. 16, 2017 (now U.S. Pat. No. 10,346,841), the contents of which are incorporated herein by reference in their entireties.

BACKGROUND

Transaction cards (e.g., access cards, credit cards, debit cards, gift cards, automated teller machine (ATM) cards, rewards cards, client loyalty cards, and/or the like) and/or devices may be used in transactions to access secure areas, pay for goods or services at transaction terminals (e.g., point of sale (PoS) terminals) of individuals or businesses engaged in the sale of goods or services, redeem loyalty rewards or credits, withdraw or deposit cash, and/or the like. Transaction cards may be associated with security keys of users, accounts of users, and/or the like, and, thus, may be used to verify an identity of users when engaging in transactions.

SUMMARY

According to some implementations, a transaction card may include a sensor to measure movement of the transaction card and one or more processors to monitor the movement of the transaction card via the sensor during a tracking period; determine measurements of a gait of a user during the tracking period from the movement of the transaction card during the tracking period; compare the measurements of the gait of the user during the tracking period and a gait signature associated with the transaction card; and/or perform an action associated with the transaction card based on a result of comparing the measurements of the gait of the user during the tracking period and the gait signature.

According to some implementations, a non-transitory computer-readable medium may store instructions that, when executed by one or more processors, cause the one or more processors to obtain a gait signature associated with a transaction card; monitor movement of the transaction card via a sensor of the transaction card during a tracking period; determine measurements of a gait of a user during the tracking period from the movement of the transaction card; compare the measurements of the gait of the user and the gait signature associated with the transaction card; and/or perform an action associated with the transaction card based on a result of comparing the measurements of the gait of the user of the tracking period and the gait signature.

According to some implementations, a method may include monitoring movement of a transaction card via a sensor of the device during a tracking period; determining measurements of a gait of a user during the tracking period from the movement of the transaction card during the tracking period; comparing the measurements of the gait of the user during the tracking period and a gait signature associated with the transaction card; determining that the measurements of the gait of the user during the tracking period do not satisfy a threshold variation of the gait signature; and/or disabling a function of the transaction card based on determining that the measurements of the gait of the user during the tracking period do not satisfy the threshold variation of the gait signature.

DETAILED DESCRIPTION

Figure 1A:
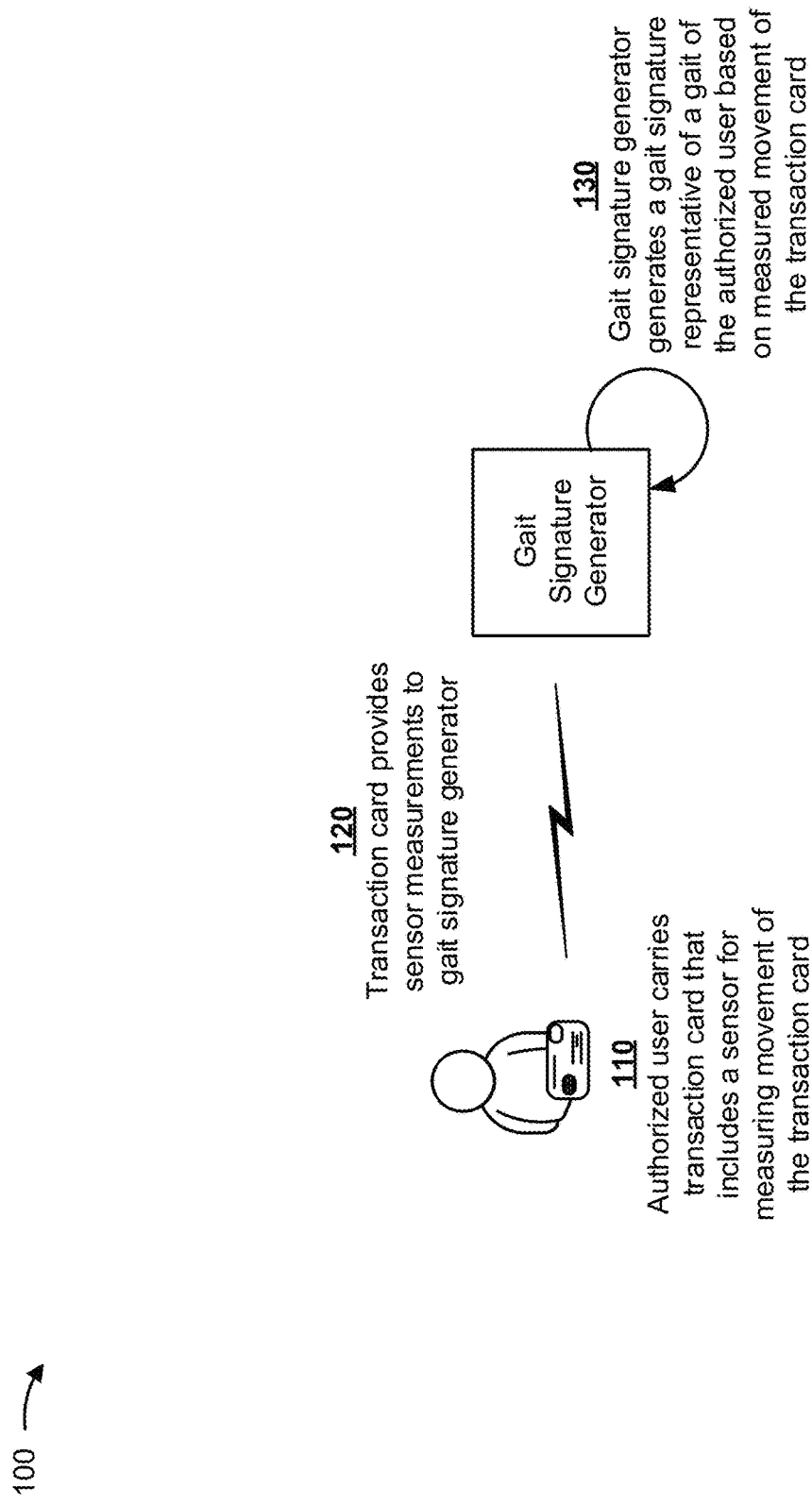
FIGS. 1A-1C are diagrams of an overview of an example implementation described herein.

The following detailed description of example implementations refers to the accompanying drawings. The same reference numbers in different drawings may identify the same or similar elements.

Transaction cards have many uses for employees, agents, consumers, businesses, and/or the like. For example, users may use transaction cards (or other similar devices) to access one or more secure areas (e.g., geographical locations, parking lots, buildings, rooms of buildings, transportation terminals, hotel rooms, campuses, venues, and/or the like), to pay for goods and/or services, to redeem rewards associated with an entity, to withdraw and/or deposit cash, and/or the like. In many instances, a transaction card may be lost or stolen, resulting in the transaction card being in the possession of an unauthorized user. Accordingly, the unauthorized user may fraudulently enter into transactions using the lost or stolen transaction card, enabling the unauthorized user to gain unauthorized access to secure areas, fraudulently pay for goods or services, fraudulently redeem rewards, fraudulently withdraw cash, and/or the like.

According to some implementations, described herein, a transaction card may include a security device to determine that the transaction card is in the possession of an authorized user or unauthorized user. For example, the transaction card may activate and/or deactivate one or more functions of the transaction card based on measurements of a gait of an individual possessing the transaction card. Accordingly, the transaction card may use one or more gait signatures associated with one or more authorized users of the transaction card to determine whether measurements of a gait of a user determined from measured movement of the transaction card indicates that the transaction card is or is not in the possession of the one or more authorized users. As such, the transaction card may determine whether an authorized user or an unauthorized user is in possession of the transaction card and enable or disable one or more functions of the transaction card accordingly. For example, the transaction card may disable the transaction card's ability to engage in a transaction if the transaction card determines that an unauthorized user is in possession of the transaction card or enable the transaction card's ability to engage in a transaction if the transaction card determines that an authorized user is in possession of the transaction card.

Some implementations, described herein, provide a transaction card (or transaction device) that ensures authorized use of the transaction card to engage in transactions. As such, the transaction card may prevent unauthorized users from accessing secure areas, accessing secure information, engaging in fraudulent financial transactions, and/or the like. Furthermore, some implementations herein may conserve resources (e.g., business resources, financial institution resources, computing resources, network resources, and/or the like) that may be involved in correcting or accounting for fraudulent activity (e.g., providing refunds, identifying the fraudulent user, and/or the like) that is prevented using example implementations described herein.

Figure 1B:
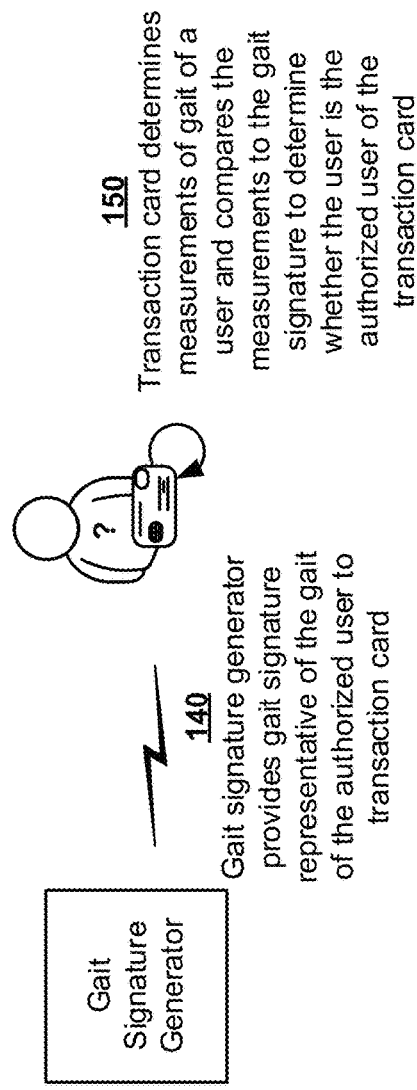
Figure 1C:
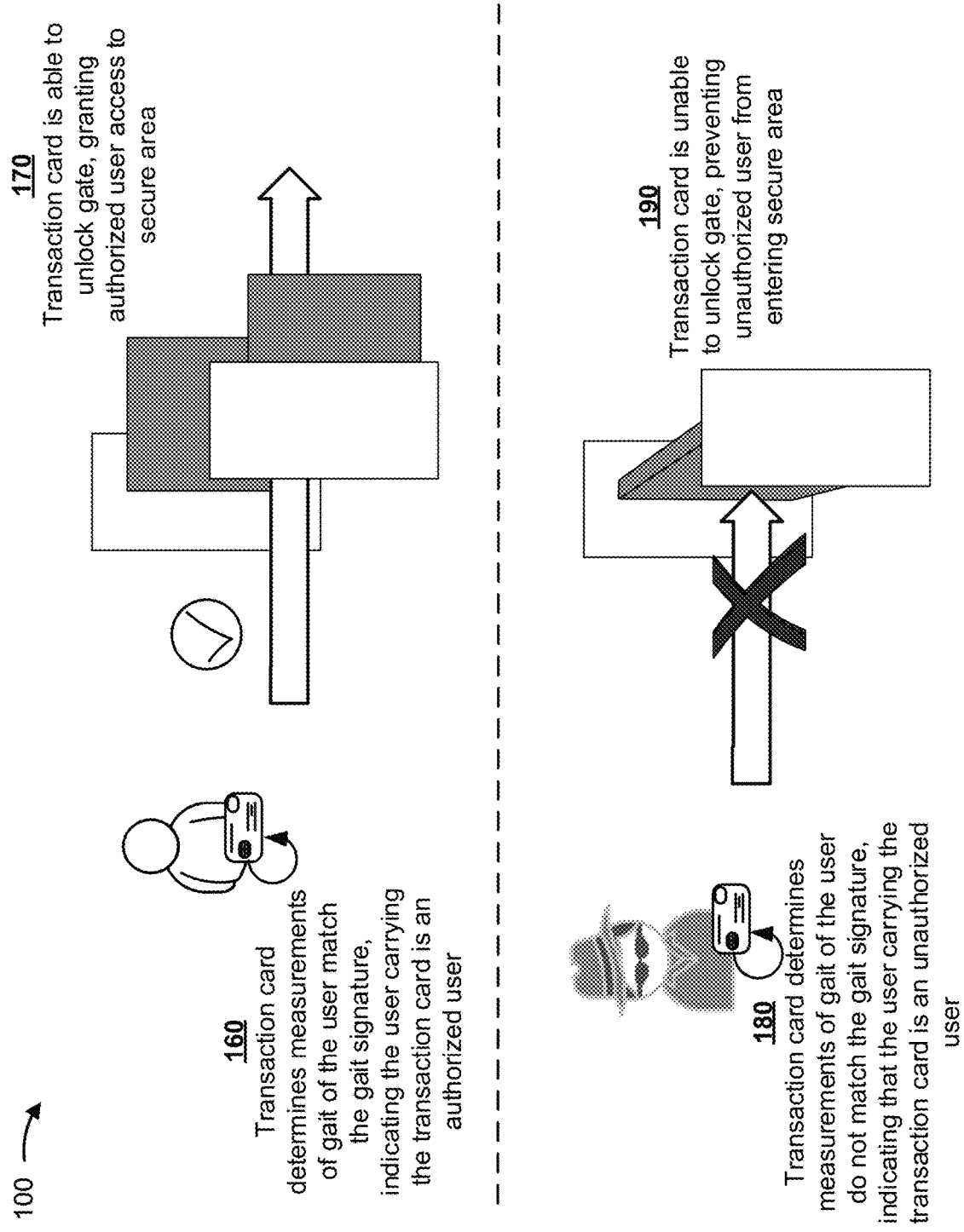

FIGS. 1A-1C are diagrams of an overview of an example implementation 100 described herein. In example implementation 100 of FIGS. 1A-1C, a transaction card (e.g., via a security device) performs a process to determine whether the transaction card is in the possession of an authorized user or an unauthorized user according to some implementations described herein. In FIGS. 1A-1C, the transaction card is monitored, tracked, and/or controlled based on a measured gait of an authorized user.

As shown in FIG. 1A, and by reference number 110, an authorized user carries a transaction card that includes a sensor for measuring movement of the transaction card. For example, the sensor may include an accelerometer, a gyroscope, a force sensor, a strain gauge, an inclinometer, a goniometer, a microphone, and/or the like that measures a change in orientation, position, rotation, altitude, and/or the like of the transaction card over time. As shown by reference number 120, the transaction card provides the sensor measurements to a gait signature generator. For example, the transaction card may send the sensor measurements via a communication link to the gait signature generator. In some implementations, the transaction card may send the sensor measurements during a calibration period corresponding to a period of time during which the sensor measurements are obtained to determine a gait of the authorized user. In some implementations, the gait signature generator may be included within the transaction card. As shown by reference number 130 of FIG. 1A, the gait signature generator generates a gait signature representative of a gait of the authorized user based on measured movement of the transaction card.

As shown in FIG. 1B, and by reference number 140, the gait signature generator provides the gait signature representative of the gait of the authorized user (e.g., during the calibration period) to the transaction card. In example implementation 100, as shown by reference number 150, the transaction card determines measurements of a gait of a user (e.g., an individual in possession of the transaction card) and compares the measurements and the gait signature to determine whether the user is an authorized user of the transaction card. For example, measurements of the gait of the user may be taken during a tracking period corresponding to a period of time during which an identity of the user of the transaction card is to be determined or verified.

As shown in FIG. 1C, and by reference number 160, the transaction card determines that the measurements of the gait of the user match the gait signature, indicating (or verifying) the user carrying the transaction card is an authorized user. For example, the measurements of the gait of the user may match or substantially match one or more gait signatures (e.g., within a threshold variation of the one or more gait signatures) representative of the authorized user. As shown by reference number 170, the transaction card is able to unlock a gate, granting the authorized user access to a secure area.

As further shown in FIG. 1C, and by reference number 180, the transaction card determines measurements of the gait of the user do not match the gait signature, indicating that the user carrying the transaction card is an unauthorized user. As such, the transaction card is unable to unlock the gate, preventing the unauthorized user from entering the secure area, as shown by reference number 190.

Accordingly, the transaction card of the example implementation 100 may allow or disallow the transaction card from being used to access a secure area (i.e., engage in a transaction to enter a secure area) based on a measured gait of an authorized user (and corresponding gait signature) and a measured gait of the user attempting to enter the secure area. Therefore, the transaction card may ensure the secure area remains secure and prevent potential harm to items, individuals, or property of an entity associated with the secure area.

As indicated above, FIGS. 1A-1C are provided merely as an example. Other examples are possible and may differ from what was described with regard to FIGS. 1A-1C. For example, the transaction card may allow or disallow the transaction card from processing a financial transaction (e.g., a payment transaction, a rewards redemption transaction, a cash withdrawal transaction, and/or the like) in a similar manner as allowing or disallowing access to a secure area as described in example implementation 100 of FIGS. 1A-1C.

Figure 2:
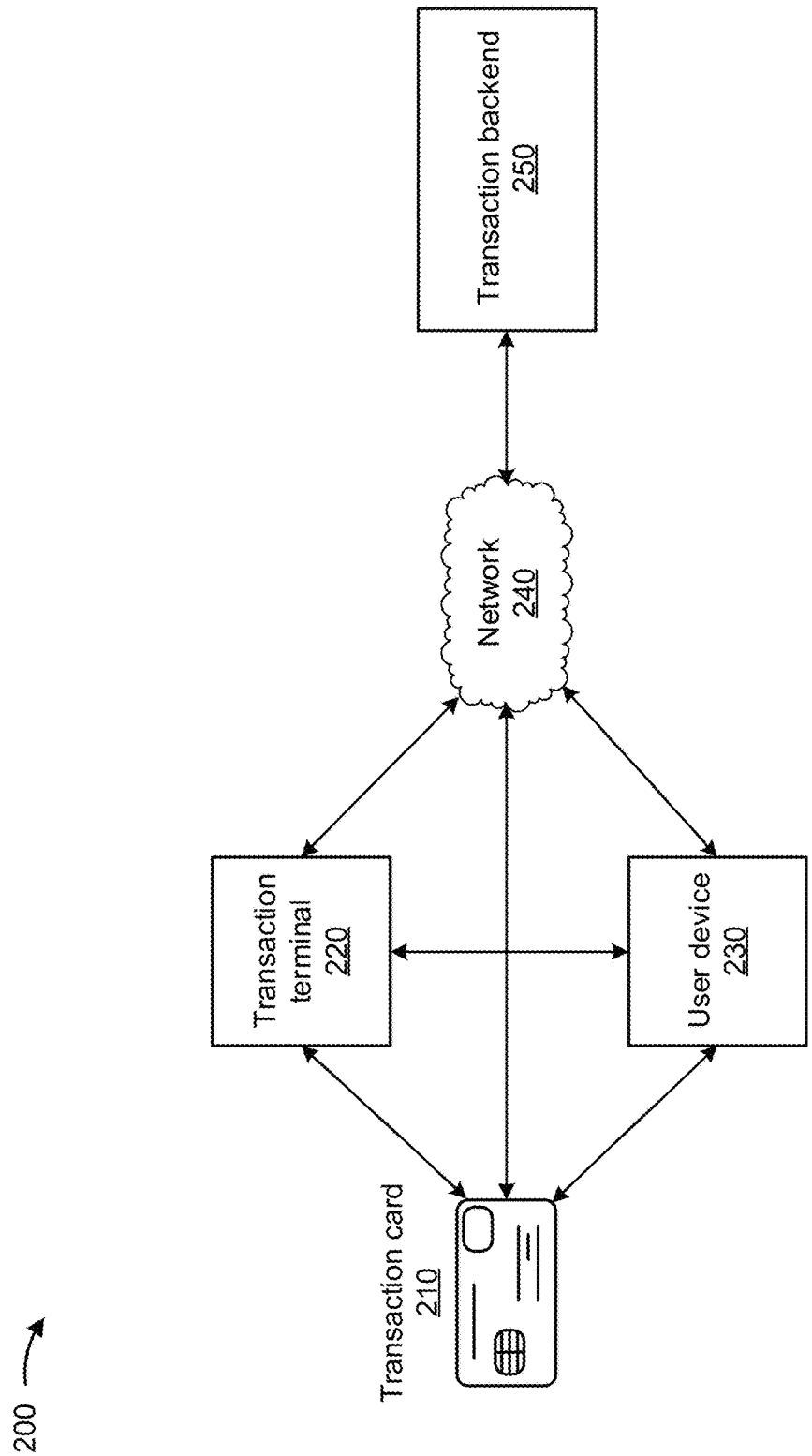
FIG. 2 is a diagram of an example environment in which systems and/or methods, described herein, may be implemented.

FIG. 2 is a diagram of an example environment in which systems and/or methods, described herein, may be implemented. As shown in FIG. 2, environment 200 may include a transaction card 210, a transaction terminal 220, a user device 230, a network 240, and a transaction backend 250. In environment 200, transaction card 210, transaction terminal 220, and/or user device 230 may communicate data, between one another, that is associated with or related to a transaction with transaction terminal 220, which facilitates processing the transaction through communication with transaction backend 250 via network 240. Devices of environment 200 may interconnect via wired connections, wireless connections, or a combination of wired and wireless connections.

Transaction card 210 includes a device (e.g., a smart transaction card, a fob, a user device, etc.), and/or the like) capable of facilitating transactions (e.g., a security access transaction, a financial transaction, and/or the like). According to some implementations, transaction card 210 may be capable of communicating with the components of environment 200. For example, in FIG. 2, transaction card 210 is capable of communicating with transaction terminal 220 to facilitate processing a transaction, with user device 230 (e.g., to communicate with transaction backend 250 via network 240), and/or with network 240. For example, transaction card 210 may communicate data including a transaction token, transaction card identification information (e.g., an account identifier, a user identifier, and/or the like), security access information, account information, financial information, transaction information (e.g., information associated with transaction terminal 220 or information associated with an entity associated with transaction terminal 220, such as a business or individual), and/or the like. According to some implementations, to communicate the data, transaction card 210 may include a magnetic strip, an integrated circuit (IC) chip (e.g., a EUROPAY®, MASTERCARD®, VISA® (EMV) chip), a radio frequency (RF) antenna (e.g., an active RF antenna, a passive RF antenna, and/or a battery-assisted RF antenna) and/or other wireless communication interface (e.g., via Bluetooth communication, Bluetooth low energy (BLE) communication, Wi-Fi communication, a near frequency communication (NFC) session, and/or the like). Accordingly, transaction card 210 may include smart technology that enables communication with the components of environment 200 and/or processing of information from the components of environment 200.

In some implementations, transaction card 210 may include sensors or devices that measure characteristics (e.g., orientation, position, rotation, altitude, and/or the like) of movement of transaction card 210. Accordingly, the sensors may generate and/or provide information and/or data associated with the movement of transaction card 210. Such information and/or data can be stored as data representative of movement of transaction card 210 and/or representative of a gait of a user.

Transaction terminal 220 includes one or more devices capable of receiving, generating, storing, processing, and/or providing information associated with processing a transaction (e.g., a security transaction, a point of sale (PoS) transaction, and/or the like). For example, transaction terminal 220 may include a communication device and/or computing device capable of receiving data from transaction card 210 and processing a transaction based on the data. In some implementations, transaction terminal 220 may include a desktop computer, a laptop computer, a tablet computer, a handheld computer, and/or a mobile phone (e.g., a smartphone, a radiotelephone, and/or the like). Transaction terminal 220 may be owned and/or operated by one or more individuals or businesses engaged in securing secure areas and/or providing security systems to secure areas. In some implementations, transaction terminal 220 may be owned and/or operated by one or more individuals or businesses engaged in a sale of goods or services (e.g., one or more merchants, vendors, service providers, and/or the like). In some implementations, after an interaction with transaction card 210, transaction terminal 220 may provide or indicate transaction information associated with a transaction to transaction backend 250.

Transaction terminal 220 includes one or more devices to facilitate processing a transaction via transaction card 210. Transaction terminal 220 may include a security access terminal, a PoS terminal, an ATM terminal, and/or the like. Transaction terminal 220 may include one or more input devices and/or output devices to facilitate obtaining transaction card data from transaction card 210 and/or from an interaction via a user of transaction card 210. Example input devices of transaction terminal 220 may include a number keypad, a touchscreen, a magnetic strip reader, a chip reader, and/or an RF signal reader. A magnetic strip reader of transaction terminal 220 may receive transaction card data as a magnetic strip of transaction card 210 is swiped along the magnetic strip reader. A chip reader of transaction terminal 220 may receive transaction card data from an IC chip (e.g., an EMV chip) of transaction card 210 when the chip is placed in contact with the chip reader. An RF signal reader of transaction terminal 220 may enable contactless transactions from transaction card 210 by obtaining transaction card data wirelessly from transaction card 210 as transaction card 210 comes within a range of transaction terminal 220. As such, the RF signal reader may detect an RF signal from an RF antenna of transaction card 210. Example output devices of transaction terminal 220 may include a display device, a speaker, a printer, and/or the like.

User device 230 includes one or more devices capable of receiving, generating, storing, processing, and/or providing information associated with facilitating a transaction in accordance with some implementations herein. For example, user device 230 may include a communication and/or computing device, such as a mobile phone (e.g., a smartphone, a radiotelephone, and/or the like), a laptop computer, a tablet computer, a handheld computer, a gaming device, a wearable communication device (e.g., a smart wristwatch, a pair of smart eyeglasses, and/or the like), or a similar type of device. In some implementations, user device 230 may be programmed to perform some or all of the functions described as being performed by transaction card 210. In this case, user device 230 may function as a virtual transaction card.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Transaction backend 250 includes one or more devices (e.g., one or more cloud-based devices, one or more data center devices, and/or the like) capable of authorizing and/or facilitating a transaction. For example, transaction backend 250 may include one or more server devices to store and/or provide information (e.g., authorizations, balances, transaction tokens, security information, account information, and/or the like) associated with processing a transaction via transaction terminal 220.

In some implementations, transaction backend 250 may include one or more devices associated with providing security access to one or more secure areas (e.g., geographical locations, parking lots, buildings, rooms of buildings, transportation terminals, hotel rooms, campuses, venues, and/or the like). For example, transaction backend 250 may include one or more devices of one or more security services and/or security entities that may control access (e.g., via transaction terminal 220) to the secure areas. Accordingly, the one or more security services and/or security entities may issue transaction card 210 to enable a user (e.g., an authorized user) to access a secure area by causing transaction card 210 to interact with transaction terminal 220.

In some implementations, transaction backend 250 may include one or more devices associated with financial institutions (e.g., banks, credit unions, and/or the like) and/or transaction card associations that authorize the transaction and/or facilitate a transfer of funds or payments between an account of a user of transaction card 210 and an account of an individual or business of transaction terminal 220. For example, transaction backend 250 may include one or more devices of one or more issuing financial institutions associated with transaction card 210, one or more devices of one or more acquiring financial institutions (or merchant banks) associated with transaction terminal 220, and/or one or more devices associated with one or more card associations (e.g., VISA®, MASTERCARD®, and/or the like) associated with transaction card 210. Accordingly, in response to receiving transaction card data associated with transaction card 210 from transaction terminal 220, various financial institutions and/or card associations of transaction backend 250 may communicate to authorize the transaction and/or transfer of funds between the accounts associated with transaction card 210 and/or transaction terminal 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
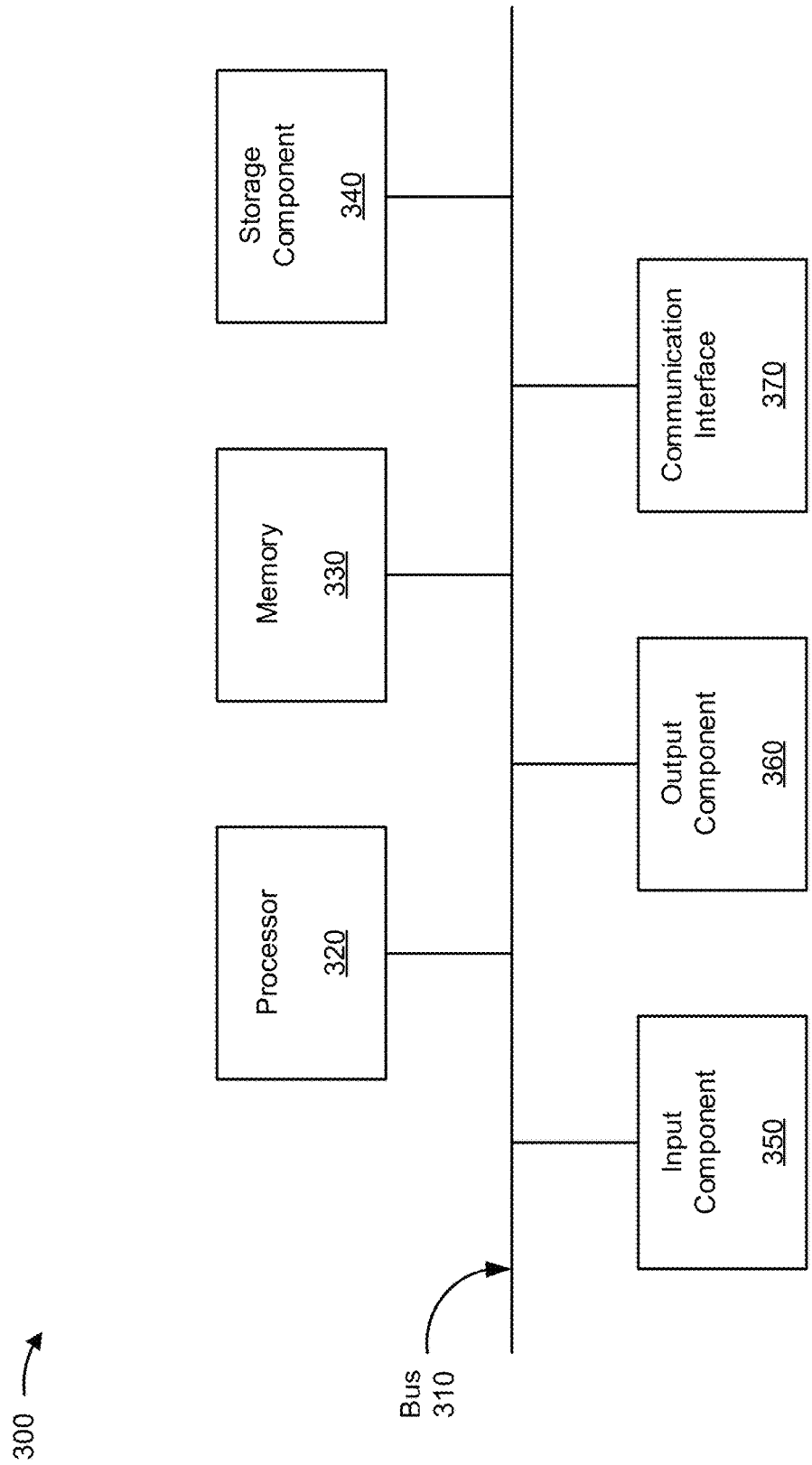
FIG. 3 is a diagram of example components of one or more devices of FIG. 2.

FIG. 3 is a diagram of example components of a device 300. Device 300 may correspond to transaction card 210, transaction terminal 220, user device 230, and/or transaction backend 250. In some implementations, transaction card 210, transaction terminal 220, user device 230, and/or transaction backend 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, a force sensor, a strain gauge, an inclinometer, a goniometer, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a RF interface, a universal serial bus (USB) interface, a Wi-Fi interface, a cellular network interface, a Bluetooth interface, a BLE interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
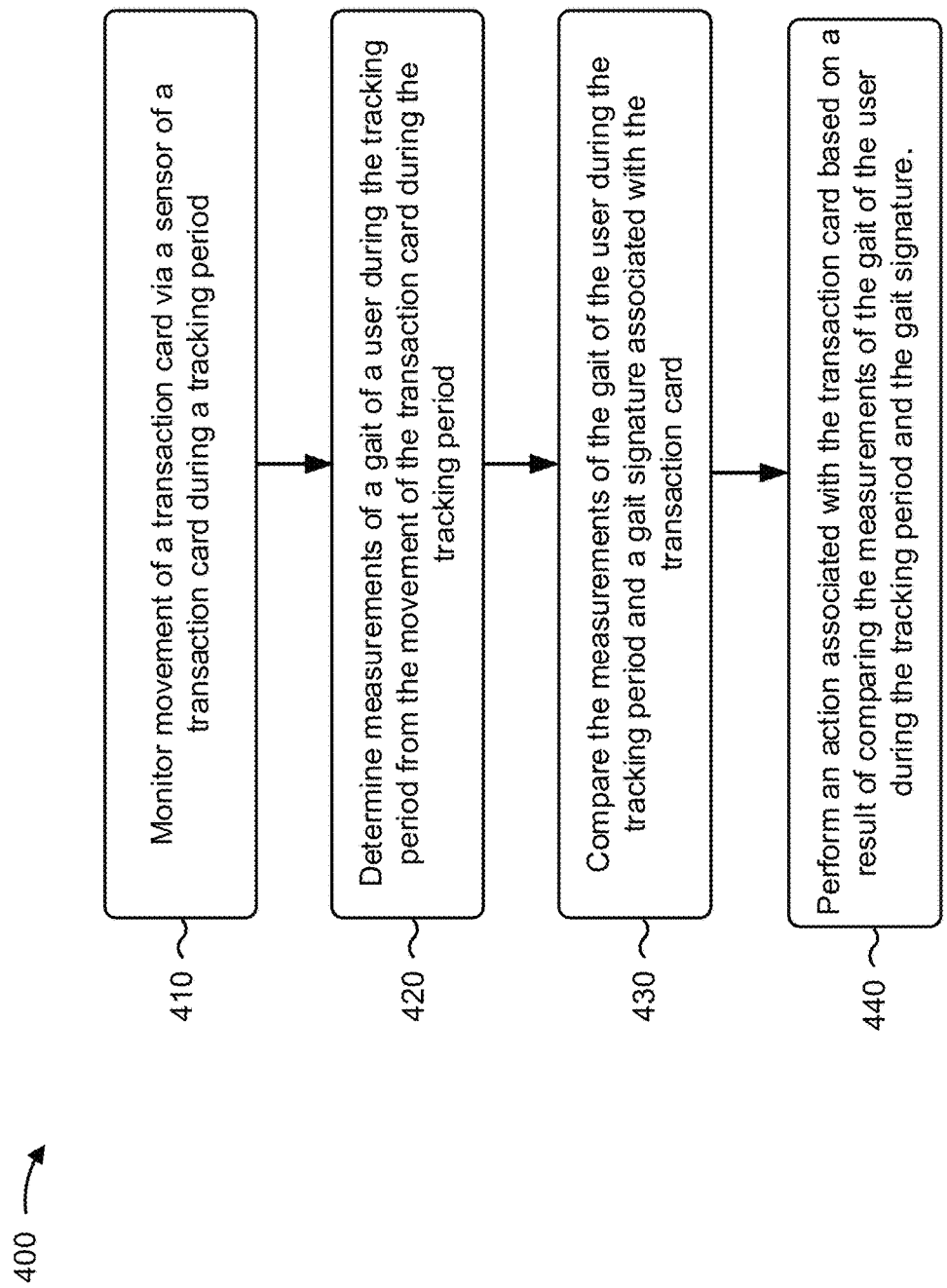
FIG. 4 is a flow chart of an example process for providing security associated with a transaction card.

FIG. 4 is a flow chart of an example process 400 for security associated with a transaction card. In some implementations, one or more process blocks of FIG. 4 may be performed by transaction card 210. In some implementations, one or more process blocks of FIG. 4 may be performed by another device or a group of devices separate from or including transaction card 210, such as transaction terminal 220, user device 230, and/or transaction backend 250.

As shown in FIG. 4, process 400 may include monitoring movement of a transaction card via a sensor of a transaction card during a tracking period (block 410). For example, transaction card 210 may monitor the movement of transaction card 210 via a sensor, or a combination of multiple sensors, of transaction card 210. In some implementations, transaction card 210 may monitor movement of transaction card 210 during the tracking period (in other words, the tracking period may begin based on at least one of detecting movement of transaction card 210, based on a calibration period ending, based on transaction card 210 being powered on, based on instructions from one or more components of environment 200, and/or the like). The sensor may monitor the movement of transaction card 210 by making measurements associated with the movement of transaction card 210.

As described above, the sensor of transaction card 210 may include at least one of an accelerometer, a gyroscope, a force sensor, a strain gauge, an inclinometer, a goniometer, a microphone, and/or the like that measures a change in orientation, a change in position, change in rotation, change in altitude, a vibration and/or the like of transaction card 210 over time. Accordingly, the sensor may provide information representative of the movement of transaction card 210. According to some implementations, transaction card 210 may monitor, via the sensor, movement based on a change in orientation, position, rotation, altitude, and/or the like.

According to some implementations, a tracking period includes a period of time during which transaction card 210 is to verify that a user of transaction card 210 is an authorized user or an unauthorized user. For example, during the tracking period, transaction card 210 is to verify or confirm that a user of transaction card 210 is an authorized user to prevent fraudulent use of transaction card 210. According to some implementations, transaction card 210 may be used to verify or confirm an authorized user is in possession of transaction card 210 based on a gait of the user in possession of transaction card 210, as described herein.

In this way, transaction card 210 may monitor movement of transaction card 210 to determine measurements of a gait of a user (or cardholder).

As further shown in FIG. 4, process 400 may include determining measurements of a gait of a user during the tracking period from the movement of the transaction card during the tracking period (block 420). For example, transaction card 210 may determine measurements of a gait of a user during the tracking period based on movement of transaction card 210 during the tracking period. In some implementations, transaction card 210 determines the measurements of the gait of the user based on monitoring and/or detecting the movement of transaction card 210.

As used herein, a user of a transaction card may refer to an individual or entity in possession of transaction card 210. Accordingly, a user may be an authorized user (e.g., a user that is authorized to use transaction card 210 in transactions) or an unauthorized user (e.g., a user that is not authorized to use transaction card 210 in transactions). In some implementations, a user may be an authorized user of transaction card 210 based on being associated with a security key (e.g., an access key to access secure areas) of transaction card 210, based on being associated with an account (e.g., a financial account, a rewards account, and/or the like) of transaction card 210, based on being associated with an individual having a security key and/or an account of transaction card 210, and/or the like.

As used herein, the gait of the user corresponds to the manner in which the user is moving. In some implementations, measurements of the gait of the user may be relative to the manner in which the user is holding and/or possessing transaction card 210. For example, transaction card 210 may determine that measurements of the gait of the user when transaction card 210 is carried in a pocket of the user's clothing may be different than measurements of the gait of the user when transaction card 210 is carried in a hand of the user, a wallet of the user, a bag of the user, a lanyard of the user, a keychain of the user, etc. Accordingly, despite the fact that a user moves in a similar manner, how the user is in possession of transaction card 210 may cause transaction card 210 to determine different measurements of the gait of the user.

In some implementations, the measurements of the gait of the user may be extracted from information or data from the sensor that indicates the gait of the user. Accordingly, the measurements may be values and/or readouts from the sensors representative of the movement of transaction card 210. Based on particular movements of transaction card 210, measurements corresponding to a gait of the user may be detected and/or obtained to determine the gait of the user. Such measurements may be compared to a gait signature as described herein.

In this way, transaction card 210 may determine measurements of a gait of a user during a tracking period to permit transaction card 210 to compare the measurements to a gait signature associated with transaction card 210.

As further shown in FIG. 4, process 400 may include comparing the measurements of the gait of the user during the tracking period and a gait signature associated with the transaction card (block 430). For example, transaction card 210 may compare the measurements of the gait of the user and one or more gait signatures associated with an authorized user of transaction card 210. In some implementations, transaction card 210 may compare the measurements of the gait of the user and the one or more gait signatures based on determining the measurements of the gait of the user, receiving a gait signature for transaction card 210, detecting an interaction with transaction terminal 220 (e.g., to initiate a transaction), and/or the like.

In some implementations, a gait signature associated with transaction card 210 may be a signature (e.g., one or more series or sequences of measurements or values) associated with a measured gait of one or more authorized users of transaction card 210. In some implementations, the gait signature may include multiple gait signatures. For example, the multiple gait signatures associated with transaction card 210 may represent multiple different manners (e.g., in a hand, in a pocket, in a wallet, in a bag, on a lanyard, on a keychain, and/or the like) in which transaction card 210 was carried and/or possessed by one or more authorized users of transaction card 210 during a calibration period (e.g., a time period for determining gait signatures of authorized users). Accordingly, one or more of a plurality of gait signatures may correspond to gait measurements of a plurality of different users. Accordingly, a gait signature may include multiple signatures representative of multiple measurements of a gait of one or more authorized users of transaction card 210. As such, transaction card 210 may be associated with multiple authorized users and, thus, store one or more gait signatures for each the authorized users.

Transaction card 210 may locally store the gait signature in a memory of transaction card 210. In some implementations, transaction card 210 generates the gait signature during a calibration period, which may take place prior to the tracking period. Additionally, or alternatively, transaction card 210 measures movement of transaction card 210 during the calibration period and transmits measurements associated with the movement to transaction backend 250, which generates the gait signature based on the measurements associated with the movement (i.e., based on movement of transaction card 210 during the calibration period). In such instances, transaction backend 250 may provide the gait signature to transaction card 210. In some implementations, transaction card 210 may initiate a calibration period or measure one or more gait signatures during a calibration period based on an activation of transaction card 210, based on instructions from user device 230 (e.g., via an application), based on user input, and/or the like.

According to some implementations, transaction card 210 may compare the measurements of the gait and the gait signature by determining whether the measurements of the gait of the user match the gait signature or are different than the gait signature. In some implementations, transaction card 210 may determine whether the measurements of the gait of the user satisfy a threshold variation of the gait signature. For example, transaction card 210 may determine that values of the measurements of the gait of the signature match a threshold number of values in the gait signature. Accordingly, as long as a threshold variation of the gait signature is satisfied, transaction card 210 may determine that the measurements of the gait of the user satisfies the threshold variation of the gait signature. As an example, transaction card 210 may determine measurements of the gait of the user matches the gait signature if a threshold percentage (e.g., 70%, 80%, 90%, etc.) of the values match the values of the gait signature.

According to some implementations, transaction card 210 compares the measurements of the gait of the user and the gait signature to determine whether the user is an authorized user or an unauthorized user. For example, transaction card 210 may determine that the user is an authorized user when the measurements of the gait of the user match (or satisfy a threshold variation of) the gait signature. On the other hand, transaction card 210 may determine that the user is an unauthorized user when the measurements of the gait of the user do not match (or do not satisfy a threshold variation of) the gait signature.

In some implementations, when the gait signature includes multiple gait signatures (a plurality of gait signatures), transaction card 210 may compare the measurements of the gait of the user to one or more of the plurality of the gait signatures. In such cases, transaction card 210 may iteratively compare the measurements of the gait of the user to one of the gait signatures until either a threshold variation is satisfied (e.g., a match is found) or all gait signatures have been compared to the measurements of the gait of the user. If a match is found, transaction card 210 may determine that the user is an authorized user. If a match is not found with any of the gait signatures (e.g., after all gait signatures were compared to the measurements of the gait of the user), transaction card 210 may determine that the user is not an authorized user.

In this way, transaction card 210 may compare the measurements of the gait of the user and a gait signature to enable transaction card 210 to perform an action associated with transaction card 210.

As further shown in FIG. 4, process 400 may include performing an action associated with transaction card 210 based on a result of comparing the measurements of the gait of the user during the tracking period and the gait signature (block 440). For example, transaction card 210 may perform the action based on the result of comparing the measurements of the gait and the gait signature. In some implementations, transaction card 210 may perform the action based on the tracking period ending.

In some implementations, transaction card 210 may perform an action to enable transaction card 210 to be used in a transaction or disable transaction card 210 from being used in a transaction. As described above, transaction card 210 may be used to process a transaction. As used herein, a transaction includes a process that involves an exchange of a transaction token (e.g., a key value, a code value, a parameter value, a signature value, a biometric token, a payment token, and/or the like) that represents and/or verifies information (e.g., access information, account information, and/or the like) associated with a user associated with transaction card 210. Accordingly, examples of a transaction may include an authorization to enter a secure area, a payment for goods and/or services, a withdrawal or deposit of cash, a redemption of rewards, and/or the like.

In some implementations, transaction card 210 may perform an action involving disabling or enabling a function of transaction card 210 based on the result of comparing the measurements of the gait of the user and the gait signature. For example, transaction card 210 may disable a function of transaction card 210 based on determining that the measurements of the gait of the user do not satisfy a threshold variation of the gait signature and/or enable a function of transaction card 210 based on determining that the measurements of the gait of the user satisfy the threshold variation of the gait signature. Such functions may include a function that causes a device to permit a particular action to occur (e.g., a function that provides an access key to a security device (e.g., transaction terminal 220) to enable access to a secure area, a function that provides a payment token to transaction terminal 220 to process a financial transaction, and/or the like), a function that unlocks a security device of transaction card 210 (e.g., a device that enables or disables operation of transaction card 210), a function that powers transaction card 210, and/or the like.

In some implementations, transaction card 210 may perform an action involving transmitting a notification (e.g., a text, a message, data, an alert, an image, an audio file, a video file, and/or the like) indicating a status (e.g., available for use in transactions or unavailable for use in transactions) of transaction card 210 to a device in communication with transaction card 210. For example, if the measurements of the gait of the user and the gait signature are not a match, transaction card 210 may transmit a notification to user device 230 and/or transaction backend 250 indicating that transaction card 210 may be in the possession of an unauthorized user. In such instances, user device 230 and/or transaction backend 250 may control security devices and/or notify security devices (e.g., transaction terminal 220) to prevent transaction card 210 from being used in transactions. In some cases, transaction backend 250 and/or user device 230 may take measures to attempt to identify the unauthorized user. For example, assuming transaction backend 250 includes a security system, transaction backend 250 may capture images of the unauthorized user using cameras near transaction terminal 220 when the unauthorized user attempts to use transaction card 210 at transaction terminal 220 in a transaction.

In this way, transaction card 210 may perform an action based on a gait of a user and a gait signature according to some implementations described herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Accordingly, examples herein provide a transaction card that is capable of enabling and/or disabling functions of transaction card 210 to prevent fraudulent use of transaction card 210. As described herein, transaction card 210 may use sensors to measure a gait of a user in possession of transaction card 210, compare measurements of the gait of the user and a gait signature of the user, and activate or deactivate transaction card 210 based on results of comparing the measurements of the gait of the user and the gait signature. For example, if the measurements of the gait of the user do not match the gait signature, transaction card 210 may be disabled, and thus unable to be fraudulently used in transactions by unauthorized users. Accordingly, fraud may be avoided, as well as, resources used in correcting fraud, such as financial resources, computing resources, and/or network resources, may be conserved.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, coupled to the one or more memories, configured to:
     receive, from a physical transaction card, first values of a gait of a user during a tracking period,
     wherein the first values are based on information from a sensor of the physical transaction card;
     compare the first values and second values of a plurality of gait signatures associated with a plurality of authorized users;
     determine that the user is an unauthorized user based on the first values not satisfying a threshold variation of any of second values; and
     disable a particular function of the physical transaction card that enables access to a secure area based on the user being an unauthorized user.

2. The device of claim 1, wherein the one or more processors are further configured to:
   capture an image of the user based on the user being an unauthorized user.

3. The device of claim 2, wherein the one or more processors, to capture the image of the user, are configured to:
   capture the image of the user based on the user attempting to use the physical transaction card.

4. The device of claim 1, wherein the device comprises a transaction terminal.

5. The device of claim 1, wherein the one or more processors are further configured to:
   determine third values of a gait of another user;
   compare the third values and the second values; and
   perform an action that enables the physical transaction card to be used in another transaction based on the other user being an authorized user.

6. The device of claim 1, wherein the one or more processors are configured to:
   transmit a notification to another device based on the user being an unauthorized user.

7. The device of claim 1, wherein the device comprises a backend device.

8. The device of claim 5, wherein the other transaction is associated with authorization to enter the secure area.

9. A non-transitory computer-readable medium storing a set of instructions, the set of instructions comprising:
   one or more instructions that, when executed by one or more processors of a device, cause the device to:
     receive, from a physical transaction card, first values of a gait of a user during a tracking period,
     wherein the first values are based on information from a sensor of the physical transaction card;
     compare the first values and second values of a plurality of gait signatures associated with a plurality of authorized users;
     determine that the user is an unauthorized user based on the first values not satisfying a threshold variation of any of the second values; and
     disable a particular function of the physical transaction card that enables access to a secure area based on the user being an unauthorized user.

10. The non-transitory computer-readable medium of claim 9, wherein the one or more instructions further cause the device to:
    capture an image of the user based on the user being an unauthorized user.

11. The non-transitory computer-readable medium of claim 10, wherein the one or more instructions, to cause the device to capture the image of the user, cause the device to:
    capture the image of the user based on the user attempting to use the physical transaction card.

12. The non-transitory computer-readable medium of claim 9, wherein the device comprises a transaction terminal.

13. The non-transitory computer-readable medium of claim 9, wherein the one or more instructions further cause the device to:
    determine third values of a gait of another user;
    compare the third values and the second values; and
    perform an action that enables the physical transaction card to be used in another transaction based on the other user being an authorized user.

14. The non-transitory computer-readable medium of claim 9, wherein the one or more instructions further cause the device to:
    transmit a notification to another device based on the user being an unauthorized user.

15. A method, comprising:
    receiving, by a device and from a physical transaction card, first values of a gait of a user during a tracking period,
    wherein the first values are based on information from a sensor of the physical transaction card;
    comparing, by the device, the first values and second values of a plurality of gait signatures associated with a plurality of authorized users;

determining, by the device, that the user is an unauthorized user based on the first values not satisfying a threshold variation of any of the second values; and disabling, by the device, a particular function of the physical transaction card that enables access to a secure area based on determining that the user is an unauthorized user.

16. The method of claim 15, further comprising:
capturing an image of the user based on determining that the user is an unauthorized user.

17. The method of claim 16, wherein the image is captured based on the user attempting to use the physical transaction card.

18. The method of claim 15, wherein the device comprises a transaction terminal.

19. The method of claim 15, further comprising:
determining third values of a gait of another user;
comparing the third values and the second values; and
performing an action that enables the physical transaction card to be used in another transaction based on determining that the other user is an authorized user.

20. The method of claim 15, further comprising:
transmitting a notification to another device based on the user being an unauthorized user.

* * * * *